UNITED STATES PATENT OFFICE.

FREDERIK CASSE, OF COPENHAGEN, DENMARK.

METHOD OF PRESERVING MILK OR CREAM.

SPECIFICATION forming part of Letters Patent No. 565,837, dated August 11, 1896.

Application filed December 16, 1893. Serial No. 493,841. (No specimens.) Patented in Germany December 5, 1893, No. 77,258.

*To all whom it may concern:*

Be it known that I, FREDERIK CASSE, engineer, Hortensiavej 18, Copenhagen, Denmark, have invented certain new and useful Improvements in Methods of Conserving Milk or Cream, (for which I have obtained a patent in Germany, No. 77,258, bearing date December 5, 1893,) of which the following is a specification.

My invention relates to a method of conserving milk and cream by keeping them as nearly as possible at the temperature of melting frozen milk.

The object of my invention is to enable the milk and cream to be preserved unaltered for a considerable length of time and, further, to prevent the cream from separating from the milk and likewise prevent the formation of butter during conveyance of the milk.

To these ends my invention consists, essentially, in placing pieces of frozen milk in the liquid milk.

The invention will be specifically described hereinafter, and the features of novelty pointed out in the claims.

In carrying out my improved method the milk, as soon as possible after it has been drawn, is cooled to a temperature of about 10° to 15° centigrade. Thereupon the milk is poured into the receptacle in which it is desired to keep it. This receptacle, preferably, should be embedded in a material that is a bad conductor of heat. A layer of sawdust about four to five inches thick will suffice for a receptacle intended to contain eight hundred to one thousand pounds of milk. A portion of the milk is congealed in any suitable manner to form pieces of frozen milk, the shape and size of the said pieces being different according to the requirements of the case. This frozen milk is placed in the receptacle and the remainder of liquid milk is then added. The frozen milk, which floats at the surface, will cool the milk to the freezing-point and maintain this temperature until almost the whole quantity of frozen milk has melted. In a receptacle of the above-mentioned capacity the milk will be conserved for two or three weeks by congealing about one-half of the milk. It will be understood that the milk can be preserved for a longer time, if necessary, by removing part of it when the entire mass has become liquid, congealing this part of the milk, and placing the solid pieces in the liquid.

An important advantage of my invention is the fact that fresh milk will be kept in its original state—that is, the cream will not separate from the milk. If the entire quantity of milk was cooled within the receptacle to congeal a portion of the milk, the frozen milk would form at and adhere to the bottom, cover, and sides of the receptacle. In this case the cream slowly separates from the milk, and the latter therefore is not preserved in its original condition. It will be observed that according to my invention the frozen milk floats on the surface of the liquid, and it is thought the gradual melting of the frozen milk will cause a circulation of liquid milk in the receptacle and thereby prevent the separation of cream.

The method is a comparatively economic one, since only a portion of the milk is congealed.

The milk may be transported in the ordinary wooden or other receptacles if these receptacles are embedded in sawdust or an equivalent material in the railway-car, the ship, or other means of conveyance.

Another important advantage of the invention resides in the fact that the floating pieces of frozen milk will to a certain extent check the movement of the liquid and thus prevent the formation of butter. This is a very valuable feature of the method, especially when the milk is to be conveyed on the sea. It will thus be possible to have a constant supply of fresh milk and cream aboard the ship for several weeks.

It will be obvious that the quantity of frozen milk used can be varied according to the season, so that when the customer receives the milk it will be almost entirely liquid, and the expense and trouble of melting the solid milk will be avoided as much as possible.

It will be further obvious that the method can be applied to the conservation of either milk or cream alone as well as to preserving fresh milk in which milk and cream are mixed with each other.

What I claim as my invention, and desire to secure by Letters Patent, is—

1. A method of preserving milk or cream which consists in separately congealing a portion thereof and placing the solid frozen portion in the remaining fluid portion of such milk or cream.

2. The herein-described method of conserving milk and cream, which consists in first cooling the entire quantity of liquid to a temperature above freezing-point, then separately congealing a part of the liquid, and placing the frozen pieces in the remainder of the liquid, as and for the purpose set forth.

3. The herein-described method of conserving milk and cream consisting in segregating a portion of the identical milk and cream to be conserved, congealing said segregated portion in a lump or lumps and placing such lump or lumps in the liquid portion from which the congealed lump or lumps have been previously separated, whereby the conserved milk will be preserved in its original integrity free from different elements either of quality or of age, all substantially as and for the purposes set forth.

In testimony that I claim the foregoing as my invention I have signed my name in presence of two subscribing witnesses.

FREDERIK CASSE.

Witnesses:
P. HOFMAN BOVY,
FRITZ TOYBEN.